(12) United States Patent
Weis

(10) Patent No.: US 9,526,377 B2
(45) Date of Patent: Dec. 27, 2016

(54) LID STORAGE SYSTEM

(71) Applicant: Kendall Peter Weis, Webster Groves, MO (US)

(72) Inventor: Kendall Peter Weis, Webster Groves, MO (US)

( * ) Notice: Subject to any disclaimer, the term of this patent is extended or adjusted under 35 U.S.C. 154(b) by 0 days.

(21) Appl. No.: 14/244,645

(22) Filed: Apr. 3, 2014

(65) Prior Publication Data

US 2015/0282616 A1    Oct. 8, 2015

(51) Int. Cl.
*A47J 47/16*    (2006.01)

(52) U.S. Cl.
CPC ..................... *A47J 47/16* (2013.01)

(58) Field of Classification Search
CPC ........... A47B 77/14; A47B 81/04; A47G 1/16; A47G 1/1606; A47G 1/1646; A47G 19/08; A47G 19/10; A47G 29/087; A47J 47/16
USPC . 211/41.1, 41.11, 41.2, 41.3, 41.7; 248/488, 489, 490, 491
See application file for complete search history.

(56) References Cited

U.S. PATENT DOCUMENTS

| | | | | |
|---|---|---|---|---|
| 928,132 A | * | 7/1909 | Kaufman | 248/490 |
| 1,065,000 A | | 6/1913 | Sarter | |
| 1,266,245 A | | 5/1916 | Fuhrmann | |
| 1,204,344 A | | 11/1916 | Dalton | |
| 1,884,370 A | * | 10/1932 | Swanson | 248/310 |
| 1,986,486 A | | 1/1935 | Swanson | |
| 2,165,654 A | | 7/1939 | Rosenthal | |
| 2,265,701 A | * | 12/1941 | Richards | 248/491 |
| 2,365,108 A | * | 12/1944 | Richards | 248/490 |
| 2,508,841 A | * | 5/1950 | Schreibman | 211/41.7 |
| 2,633,994 A | | 4/1953 | Brown | |
| 2,695,152 A | | 11/1954 | Parulski | |
| 2,737,361 A | * | 3/1956 | Petzke | 248/491 |
| 2,972,414 A | | 2/1961 | Spie | |
| 3,094,215 A | | 6/1963 | Spie | |
| 3,326,387 A | | 6/1967 | Princevalle | |
| 3,465,892 A | | 9/1969 | Taylor | |
| 3,788,589 A | * | 1/1974 | Schulze | 248/488 |
| 4,364,537 A | * | 12/1982 | Helzer | 248/448 |
| 4,367,819 A | | 1/1983 | Lewis | |
| 4,473,207 A | * | 9/1984 | Nascher | 248/490 |
| 4,739,961 A | * | 4/1988 | Thomas | 248/490 |
| 4,776,469 A | | 10/1988 | Geleziunas | |
| D306,528 S | * | 3/1990 | Worley | D6/309 |
| 4,911,310 A | | 3/1990 | Ralshe | |

(Continued)

*Primary Examiner* — Joshua Rodden
(74) *Attorney, Agent, or Firm* — Armstrong Teasdale LLP

(57) ABSTRACT

The Lid Storage System provides an organized and secure method of storing pot lids, decorative plates or other similar items on a mounting surface in an approximately vertical position. The system in its simplest form consists of one top bracket and two lower brackets for each lid. Each bracket may include a double-sided adhesive pad to affix each bracket to the mounting surface but may also include a passage for a fastener if needed. The top bracket includes a top flange that is longer than the lower flange of each lower bracket, which provides the needed clearance for the lid to slide up into the top bracket and clear the lower flange of each lower bracket for insertion and removal of the lids. The top bracket is arranged on the centerline of the lid and the lower brackets are arranged one on either side of the center line. The lid nests within the brackets in the stored position in which the lid also remains secured during any movement of the mounting surface such as a cabinet door.

18 Claims, 7 Drawing Sheets

(56) References Cited

U.S. PATENT DOCUMENTS

| | | | |
|---|---|---|---|
| 4,998,627 A | | 3/1991 | Elder |
| 5,207,334 A | | 5/1993 | Lear |
| 5,295,651 A | * | 3/1994 | Baker, Jr. .................... 248/488 |
| D362,778 S | | 10/1995 | Mele |
| 5,660,284 A | | 8/1997 | Vaughn |
| 5,673,800 A | | 10/1997 | Connolly |
| D401,811 S | | 12/1998 | Hait |
| 6,748,688 B2 | * | 6/2004 | Matara .......................... 40/794 |
| D500,638 S | | 1/2005 | Srivastava |
| 6,974,039 B2 | * | 12/2005 | Comartin et al. ........... 211/41.1 |
| 7,104,409 B2 | | 9/2006 | Morgan |
| 7,419,129 B2 | * | 9/2008 | Kixmoeller ................. 248/488 |
| 2003/0213759 A1 | | 11/2003 | Compagnucci |
| 2008/0314846 A1 | | 12/2008 | Klein |
| 2009/0173703 A1 | | 7/2009 | Einbinder |
| 2010/0213146 A1 | | 8/2010 | Thorpe |

* cited by examiner

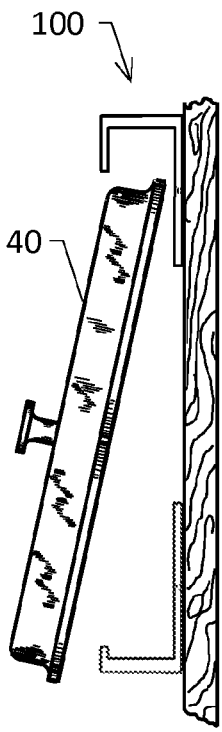 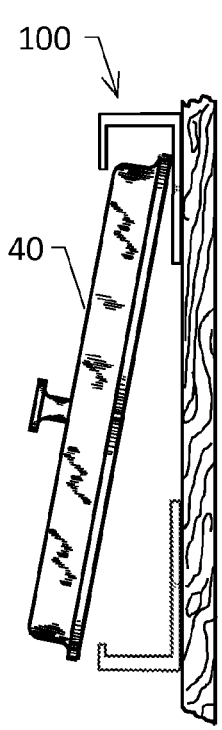 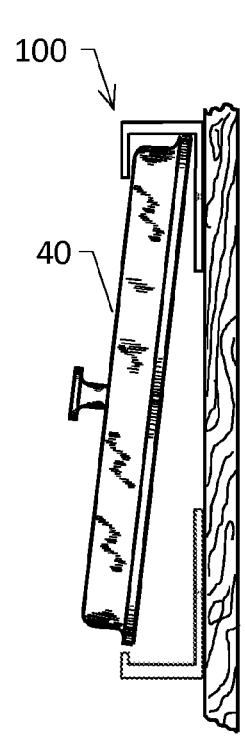
FIG. 11A    FIG. 11B    FIG. 11C
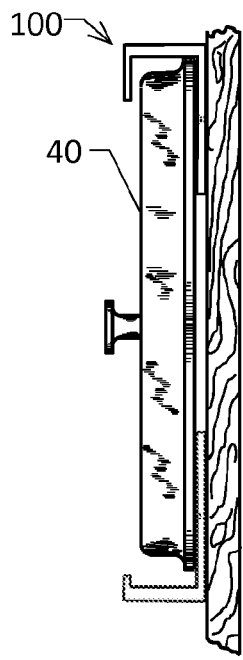 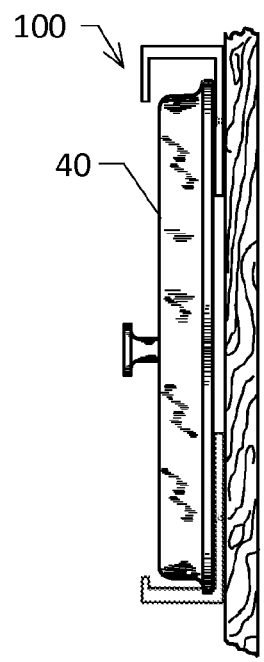 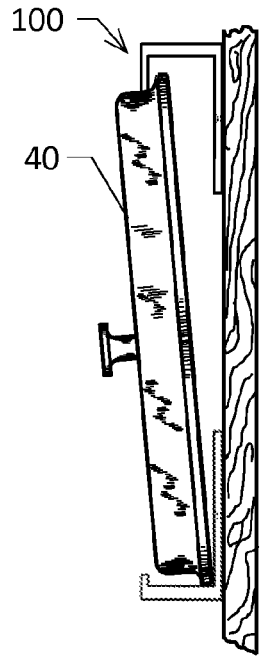
FIG. 11D    FIG. 11E    FIG. 11F

LID STORAGE SYSTEM

FIELD OF THE INVENTION

This disclosure relates generally to article storage devices, and more particularly, to holders for cooking utensil covers such as lids. The disclosure further relates to an apparatus for decorative display of plates and the like.

BACKGROUND OF THE INVENTION

In regard to lid storage, there is a continuing need for devices which will organize and store kitchen utensils. Cooking utensil covers (lids) are particularly difficult to store efficiently. The irregular shapes of the lids, and particularly their knobs or handles, interfere with efficient stacking of the lids. The lids must usually be stored in out-of-the-way drawers; when stored in cabinets they take up a lot of otherwise needed space.

One type of existing lid storage systems may include loops, hooks, or other receptacles designed to receive a knob of a lid to secure the lid in place. This type of storage system is typically too bulky for use in limited spaces such as the inner surface of a cabinet door. In addition, this type of storage system may lack the ability to secure pot lids that include a handle with any shape other than a knob. For example, larger pot lids may include a more substantial U-shaped handle that would be incompatible with a receptacle shaped to receive a rounded knob. Further, the lids stored in this type of storage system may fail to firmly secure the lids and/or may result in excessive wear to the knobs of the lids due to the concentration of the holding forces within a relatively small area.

To address these shortcomings, other types of existing lid storage systems may include slots or other arrangements of holding elements within which a portion of the lower edge of a pot lid may rest. Although this type of storage system may accommodate a wider variety of lid with any type of knob or handle, the upper edge of the lid remains unsecured in this type of storage system. This unsecured upper edge of the lid may wobble if the storage system is installed on a movable surface such as a cabinet door, resulting in excessive loading on the holding elements and/or fasteners securing the holding elements, reducing the working life of the system. In addition, the unsecured upper edge of the lid stored in this type of device may render the lid vulnerable to falling out of the storage system. This type of system could also be installed on a shelf or bottom of the cabinet but, in doing so, usually takes up valuable shelf space within the cabinet.

Yet other types of storage systems, typically used for the display of plates, may incorporate holding elements that are distributed around the entire perimeter of the edge of the plate or lid. Typically, the holding elements securing the upper edge of the lid or plate are mechanically secured into place using a sliding or spring-loaded mechanism. While this mechanism may hold the plate or lid securely into place, it is difficult to rapidly remove the lid or plate when needed, and is nearly impossible to remove using only one hand, as may be desired in a kitchen setting.

A need exists for a lid storage system with a compact design suitable for mounting to cabinet doors, kitchen backsplashes or to other surfaces usually being vertical. It would further be desirable to provide a lid storage system that would require a minimum of space and utilize otherwise unusable space such as the inside of a cabinet door. Additionally it would be desirable to provide a lid storage system which holds the lids securely without tilt and which inhibits wobble and noise as a cabinet door upon which the lid storage system is mounted is opened and closed. A need further exists for a lid storage system which would provide safety features such as baby proofing.

In regard to decorative display of plates and the like, plates are commonly used for decorative display and are popular collector's items. However existing plate display systems reveal difficulties in attractively displaying the collection due to size differences of the plates. Some designs may rely on spring-biased hooks or sliding clips which engage the plate's outer edge. This type of plate display system is impractical if the plate is to be removed and replaced for even occasional use or cleaning. Other designs incorporate slots or other holding elements designed to accommodate the lower edge of the plate. These designs typically impede the view of a significant portion of the displayed plate.

It would be desirable to provide a holder for decorative plates or the like which would hold the plates securely but allow for relatively easy removal and replacement as needed for occasional use, cleaning, or closer examination.

BRIEF SUMMARY OF THE INVENTION

It is an object of the invention to provide a holder for cooking utensil covers (lids) which could be mounted to cabinet doors or other vertical surfaces.

It is another object of the invention to provide a holder for cooking utensil covers (lids) which would require minimal space.

It is another object of the invention to provide a holder for cooking utensil covers (lids) which would hold the lids securely and retard wobble and noise as the cabinet doors are opened and closed.

It is yet another object of the invention to provide a holder for cooking utensils covers (lids) which will prevent tilting of the lids and the resultant dislodging of the holder from the surface to which it is attached.

It is still another object of the invention to provide a holder for cooking utensil covers (lids) which would hold the lids securely thus providing some degree of child proofing.

It is an object of the invention to provide a holder for decorative plates or the like which would hold the plate or similar items securely to a vertical surface.

It is an object of the invention to provide a holder for decorative plates or the like and be attractive.

BRIEF DESCRIPTION OF THE SEVERAL VIEWS OF THE DRAWING

There are shown in the drawings embodiments which are representations of the invention. However, the invention is not limited to the precise arrangements and instrumentalities shown therein. The shapes of the brackets are shown as rectangular per FIGS. 1 through 12 but could be any other shape, i.e. oval, egg shapedor triangular, etc. Examples of a few possible shapes are shown in FIGS. 13, 14 & 15.

FIG. 11A-11F are a series of sub figures, in sequence, showing the insertion of the lid 40 into a lid storage unit 100.

Corresponding reference characters and labels indicate corresponding elements among the views of the drawings. The headings used in the figures should not be interpreted to limit the scope of the claims.

DETAILED DESCRIPTION OF THE INVENTION

In various aspects of the disclosure a lid storage system is described that provides an organized and secure method of storing pot lids, decorative plates, pictures, plaques, hubcaps, or other similar items without restriction on a mounting surface oriented within about ±30° of vertical. In one aspect, the lid storage system may include two or more lid storage units. Each lid storage unit may include a top bracket and two or more lower brackets arranged in an inverted Y arrangement on a vertical mounting surface as described herein below.

The lid storage unit and lid storage system overcome the shortcomings of existing lid storage unit designs. Some of the advantages of the disclosed lid storage system are: a low profile, secure method of holding lids, suitable, for mounting in limited spaces such as the inside of a cabinet door, simple/quick/one-handed insertion and removal of lids, providing baby proofing to some degree, expandability to any number of lids, unlimited attractive designs and colors, unlimited to suitable, materials for construction, etc.

Details of the lid storage unit and lid storage system are provided herein below.

I. Lid Storage Unit

Figure 1:
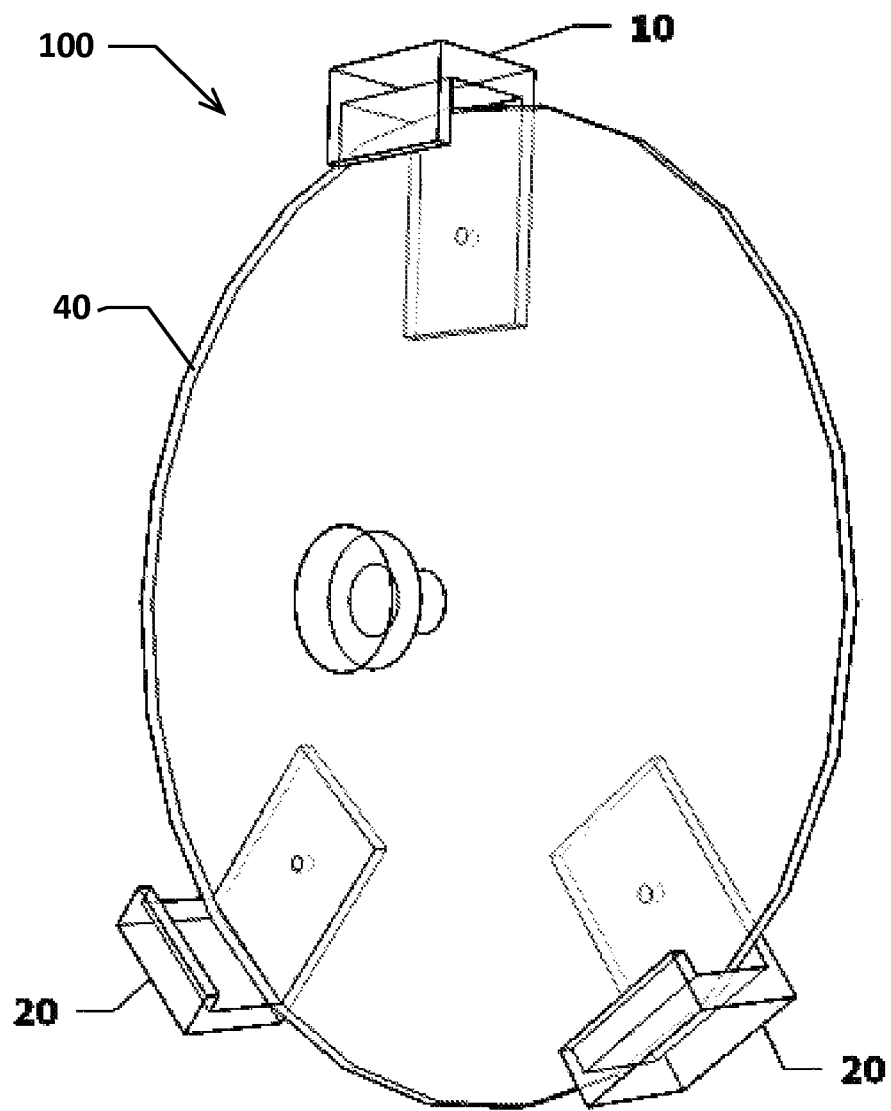
FIG. 1 is a perspective view of a lid storage unit 100 according to the invention.
Figure 12:
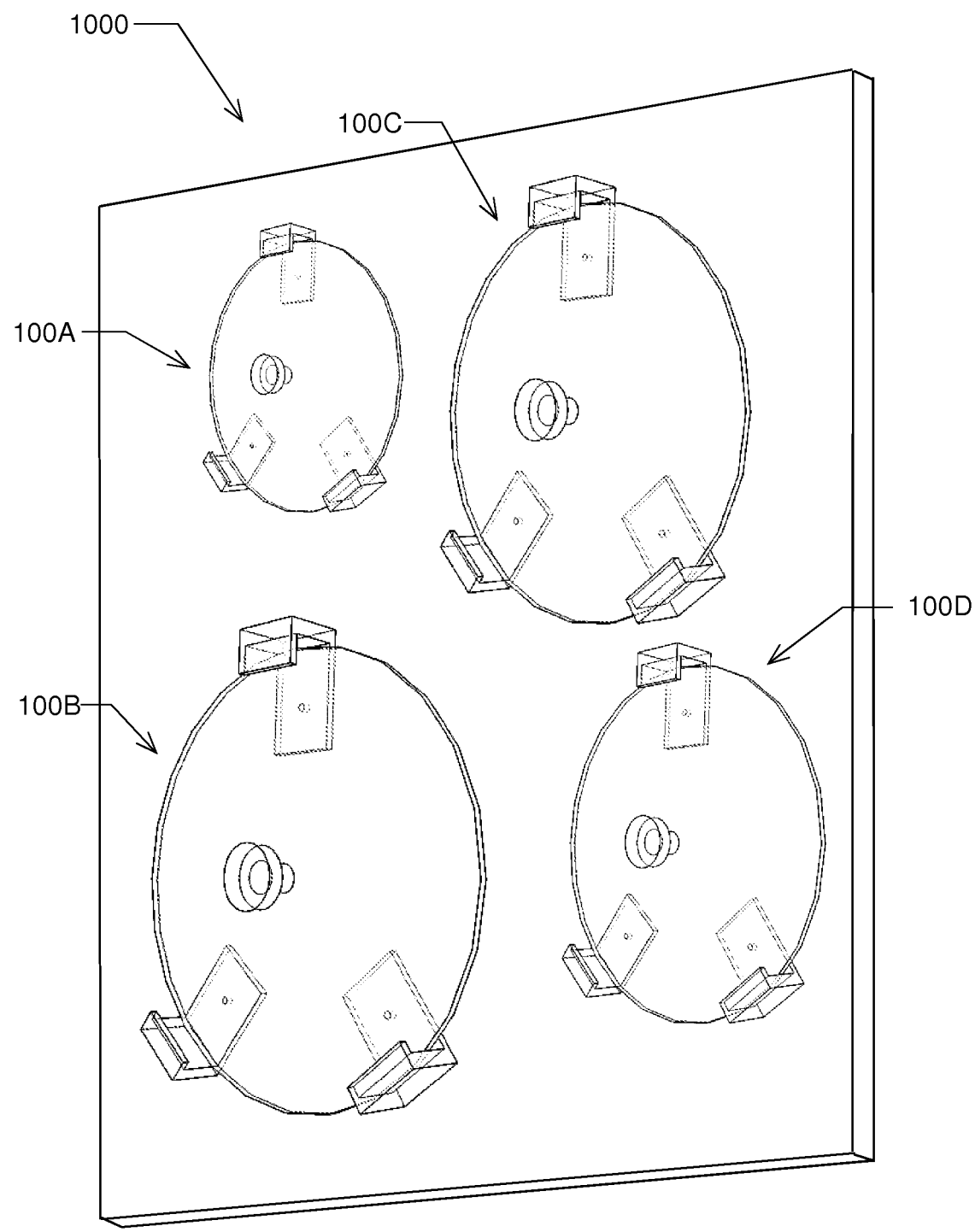
FIG. 12 shows a lid storage system 1000 consisting of four lid storage units 100 mounted on the back of a door.
Figure 13:
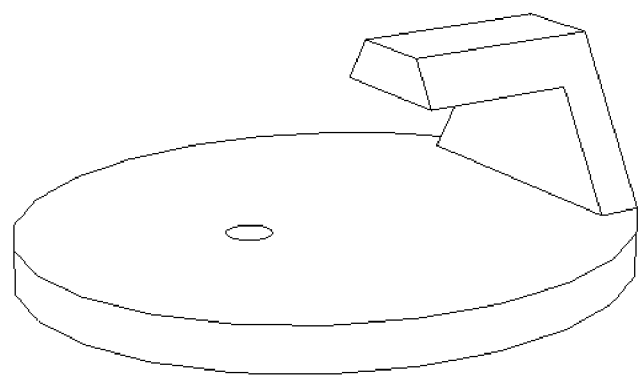
FIG. 13 shows a top bracket depicting an oval base with angular retaining elements.
Figure 14:
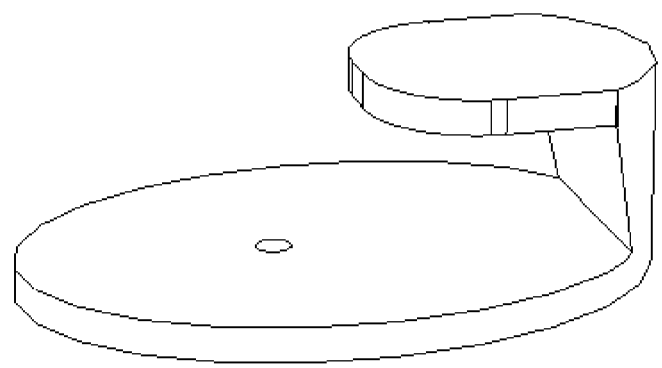
FIG. 14 shows a top bracket depicting an oval base with a rounded retaining element and a slanted upright to help hold lid close to base.
Figure 15:
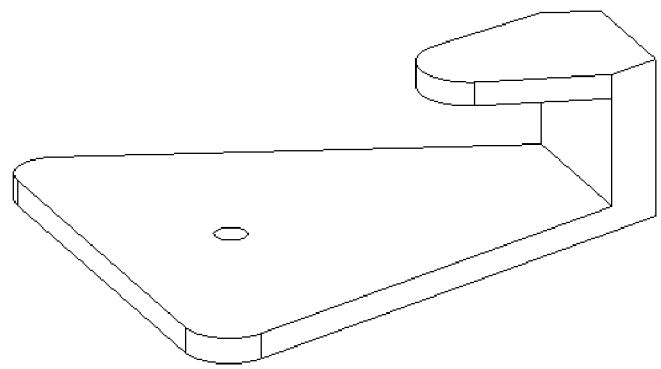
FIG. 15 shows a top bracket depicting an triangular base with rounded corners and a somewhat triangular retaining element and a straight upright.

A lid storage unit 100 is shown in FIG. 1 Two or more lid storage units may be included in a lid storage system 1000 as shown in FIG. 12. Each lid storage unit 100 may include a top bracket 10, and two or more lower brackets 20. Although there may be two or more lower brackets, two will be used to illustrate and describe the lid storage unit 100 herein by way on non-limiting example. Each lid storage unit 100 may include a set of brackets associated with the storage of one lid 40. Additional lid storage units 100 may be provided to store additional lids 40 as part of the lid storage system 1000. Although the drawings represent the brackets in basically a rectangular configuration they could be made in any shape without limitation, i.e. oval, egg shaped, triangular, etc. The embodiment of this invention is not limited by any particular overall shape, material or color but by how each component is made and arranged to secure a lid or decorative plate to a vertical surface or any surface regardless of orientation.

Both the top bracket 10 and lower brackets 20 are not restricted in their construction or appearance;
 a) materials of construction: any suitably strong material without limitation including but not limited to metal, wood, plastic, glass, etc.;
 b) the brackets may be unitary construction or separate pieces fastened together;
 c) brackets may be constructed of a single material or more than one material—rubber or other low-slip material for surfaces contacting lid, decorative facade, color-coded labels, etc.;
 d) the brackets may be any color or combination of colors and textures without limitation;
 e) the means of attaching brackets to a surfaces are not limited: any suitable attachment means without limitation including but is not limited to adhesive backings such as tacky or pressure-sensitive adhesives, a VELCRO pad to be joined with a corresponding VELCRO pad mounted on the vertical surface, one or more nails or screws, a magnet, or any other suitable fastening means known in the art.

Figure 9:
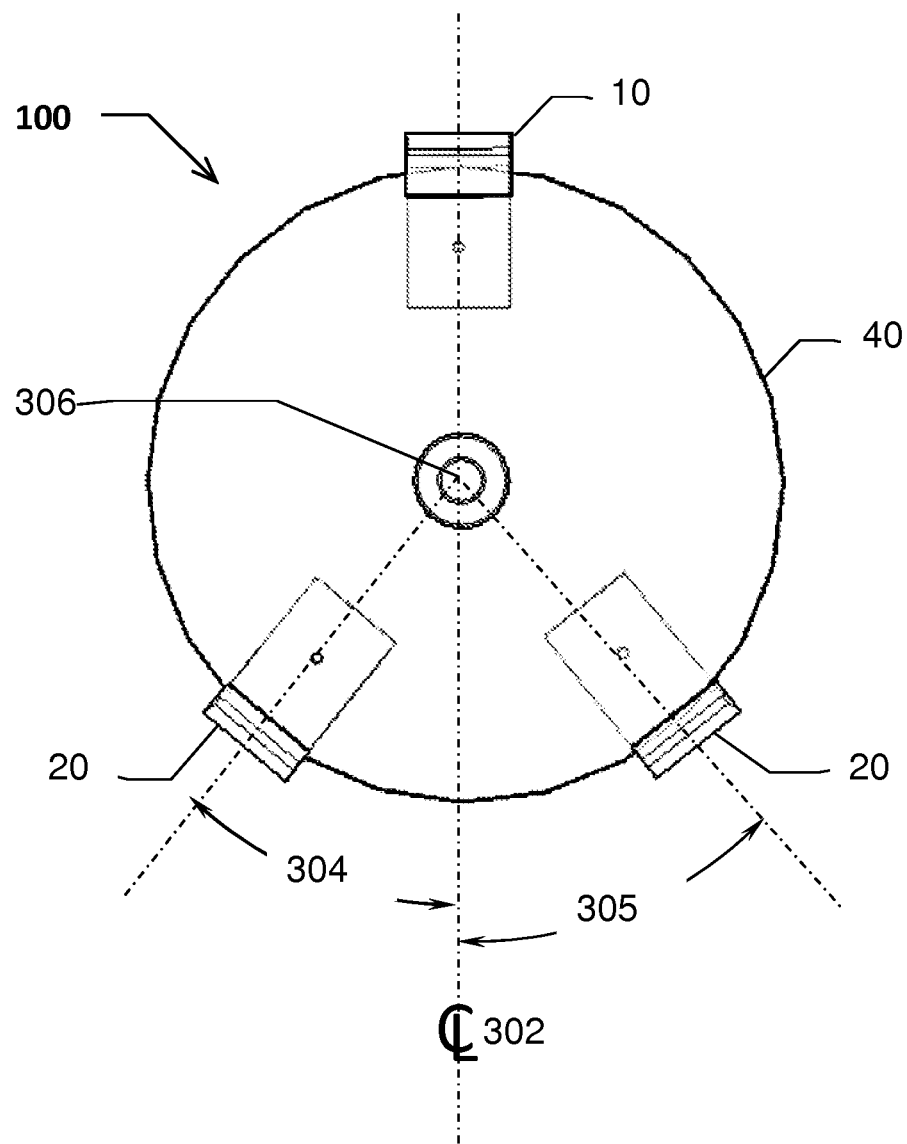
FIG. 9 is a front view of a lid storage unit 100 showing relative placement of the top bracket 10 and lower brackets 20 around the lid 40.

The top bracket 10 and lower brackets 20 are arranged around the lid 40 in an inverted "Y" formation. In an aspect, the top bracket 10 may be situated essentially on a vertical centerline 302 of the lid 40 and each of the lower brackets 20 are situated on opposite sides of the vertical center line 302 as illustrated in FIG. 9. In various aspects, the lower brackets 20 may be situated at an angle 304 and 305 ranging from about 20° to about 70° on either side of the centerline 302 with the vertex 306 of the angles being the center of the lid 40 and at a distance equal to the radius of the lid. Symmetry of angles 304 and 305 in relation to the centerline 302 is desired but is not necessary for the function of the lid storage unit 100. For example one angle could be 40° and the other angle could be 30°. In another aspect, the lower brackets 20 are situated at about 40° for both angles 304 and 305 on each side of the centerline 302.

In an aspect, both the top bracket 10 and the lower brackets 20 may be formed of planar elements as their base, a perpendicular element 13 and 23 forming an "L" shape when viewed from the side as illustrated in FIGS. 2-7. On top of these elements are flanges 12 and 22, respectively, which are parallel to the base and running back over the base forming a hook or "J" shaped. The flanges on each of the brackets, described in detail herein below, retain the lid 40 during storage in the lid storage unit 100. The flange 12 of the top bracket 10 is longer than the flanges 22 of the lower brackets 20 which then provide the needed clearance for the lid 40 to slide up into the top bracket 10 and thereby clear the flange 22 of each of the lower brackets 20 during the insertion of the lid 40 into the lid storage unit 100. The elongated flange 12 of the top bracket 10 is a key design feature which makes possible the secure retention of the lid 40 in the lid storage unit 100, while further facilitating the simple, one-handed insertion and removal of the lid 40.

The lower brackets 20 provide the support for the lid 40 in a downward direction as well as in a horizontal direction when installed on a vertical mounting surface as described above. The flanges 12 and 22 provide the means for keeping the lid from tilting or falling off the vertical mounting surface. Once the brackets are attached to a vertical mounting surface including, but not limited to an inside surface of a cabinet door, the lid 40 can be inserted into the top bracket 10 and then lowered into the lower brackets 20 thereby nesting the lid within the brackets and securing the lid 40 during any movement of the vertical surface. A similar lid storage unit 100 may be provided for each lid 40 to be stored within a complete lid storage system 1000.

Although a typical storage system 1000 would accommodate lids or plates, other items without restriction could be stored with the system 1000. Non-limiting examples of items suitable for storing within the storage system 1000 may include but not limited to: plaques, framed pictures, hubcaps, etc. The item stored can be of any profile without restriction including but not limited to round, oval, square, rectangle, polygonal, etc. In an aspect the storage system 1000 may be configured to store round or oval lids.

In the storage system 1000 for lids 40 the size/shape/location of the lid handle does not influence in any way the effectiveness of the lid storage unit—it may impact the profile of the lids stored in the unit mounted on the vertical surface, but little else.

II. Top Bracket

In one aspect, the top bracket 10 is illustrated in FIGS. 1-4. The top bracket 10 may include a base 15 for attachment of the top bracket 10 to a vertical surface (not shown), a top perpendicular element 16, of suitable height to accommodate the lid, for constraining the vertical movement of a lid 40 mounted in the lid storage unit 100, and a top flange 12 for constraining the perpendicular movement of the lid 40 away from the vertical surface to which the lid storage unit 100 is mounted.

In this aspect, the top bracket 10 may include a base with a planar face 15 for mounting to a vertical surface, and on the opposite side a plate or lid contact face. The base 15 may be provided in any shape suitable for mounting to a vertical surface without limitation. In an aspect, the base 15 may have a generally flattened planar form, as illustrated in FIGS. 1-4.

Figure 10:
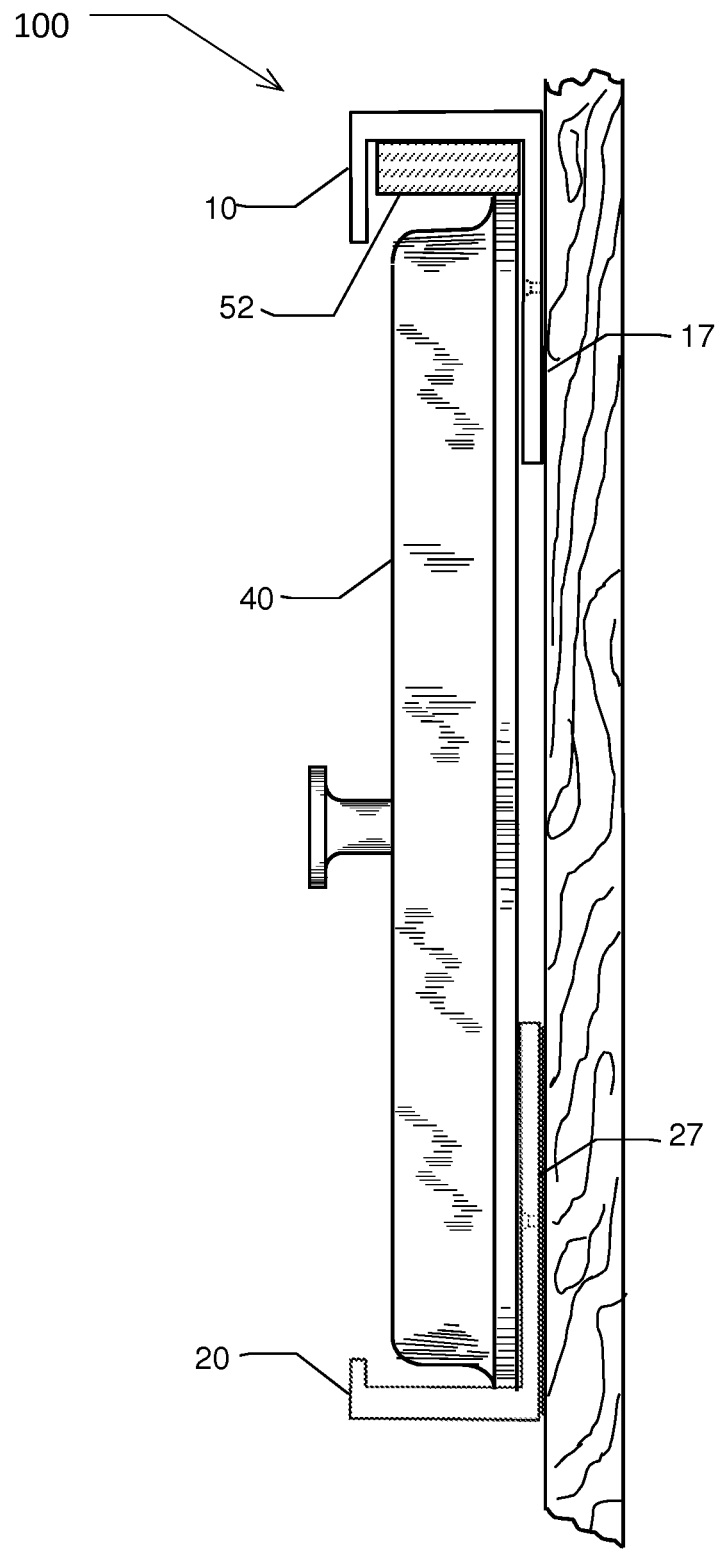
FIG. 10 is side elevation depicting attachment of the lid storage unit 100 to a cabinet doors inner surface, the engagement of a cooking utensil cover (lid) 40 and the installation spacer 52.

The mounting face 15 shown on FIGS. 1-4 may be provided with an integral fastener as shown in FIG. 10 to fix the mounting face 15 to the vertical surface. Non-limiting examples of suitable integral fasteners include adhesive backings such as tacky or pressure-sensitive adhesives, a VELCRO pad to be joined with a corresponding VELCRO pad mounted on the vertical surface, one or more nails or screws, a magnet, or any other suitable fastening means known in the art. FIG. 10 shows a double sided adhesive 17 acting as the means for mounting the top bracket to the vertical surface for illustrative purposes but any suitable method known in the art may be utilized without limitation.

Referring back to FIGS. 2-4, the base 15 may be provided with one or more passages 14 passing through the base 15 to accommodate one or more separate fasteners (not shown) for affixing the top bracket 10 to the underlying vertical surface. Non-limiting examples of suitable separate fasteners include: pins, tacks, nails, screws, bolts, or any other suitable fastener.

In an aspect, the top perpendicular element 16 may project from the base 15, forming a lid contact face 13. The top perpendicular element 16 may be provided in any shape suitable for constraining the vertical movement of an upper edge of the lid 40 without limitation. In an aspect, the top perpendicular element 16 may have a generally flattened planar form, as illustrated in FIGS. 1-4. In an aspect, the top perpendicular element 16 may project up from the outer end of 15 at an angle of about 90° as illustrated in FIGS. 1-4.

Figure 2:
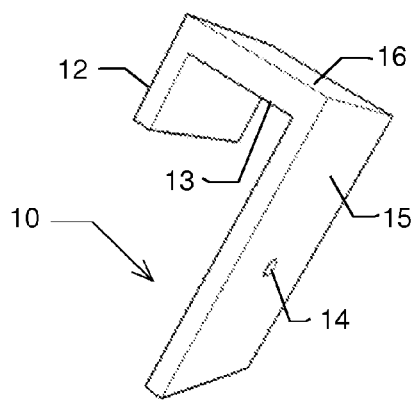
FIG. 2 is a perspective view of the top bracket 10
Figure 3:
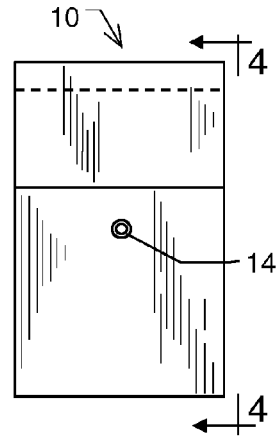
FIG. 3 is a front elevation of the top bracket 10
Figure 4:
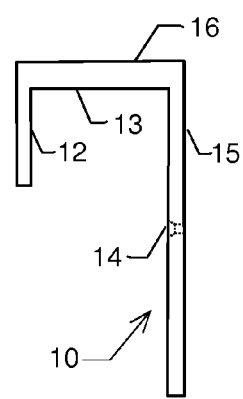
FIG. 4 is a side elevation of the top bracket 10

The lid contact face 13 may be provided in any shape without limitation including flat, curved, slanted, and faceted. In one aspect, the lid contact face 13 may be flat, as illustrated in FIGS. 2-4. The contact face 13 may be fitted with some form of additional cushioning, without limitation, to help hold or protect the lid.

In another aspect, the perpendicular element 16 may terminate in a top flange 12 aligned essentially perpendicular to the perpendicular element 16 and extending downward and parallel to the base 15. In an aspect, the length of the top flange 12 may be any length suitable for retaining the upper edge of the lid 40 when the lower edge of the lid 40 is resting on the lid contact face 23 of the two or more lower brackets 20. The top flange 12 must be slightly longer than the flange 22 of the lower brackets 20. The top flange is preferably at least ¼ inch longer than the lower flanges 22. The top bracket flange 12 and lower flange 22 of the lower brackets 20 function cooperatively to retain a lid 40 inserted into the lid storage unit 100.

III. Lower Brackets

Figure 5:
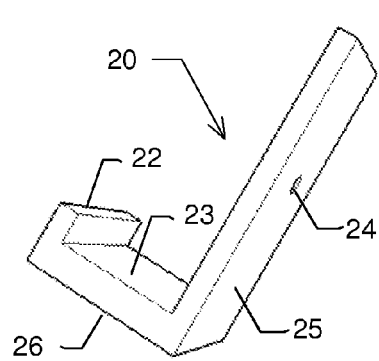
FIG. 5 is a perspective view of a lower bracket 20
Figure 6:
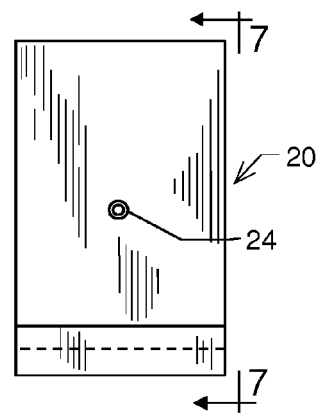
FIG. 6 is a front elevation of the lower bracket 20
Figure 7:
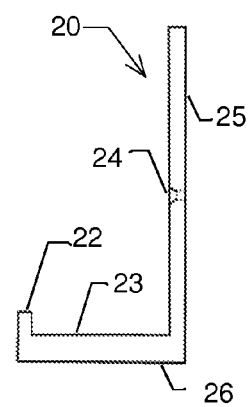
FIG. 7 is a side elevation of the lower bracket 20
Figure 8:
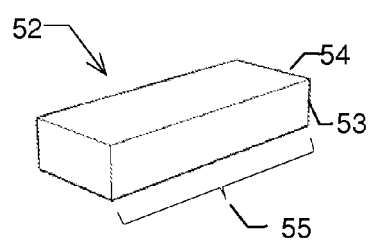
FIG. 8 is a perspective view of the spacer 52

The lower brackets 20 provide a lower support for the bottom edge of the lid 40 when mounted in the lid storage unit 100. Each of the lower brackets 20 are essentially identical, as illustrated in FIGS. 5-7. The lower bracket 20 may include a base 25 for attachment of the lower bracket 20 to a vertical surface (not shown), a lower perpendicular element 26 for supporting the lower edge of a lid 40 mounted in the lid storage unit 100, and a lower flange 22 for constraining the perpendicular movement of the lid 40 away from the vertical surface to which the lid storage unit 100 is mounted. In this aspect, the lower bracket 20 may include a base 25 for mounting to a vertical surface and on the opposite side a plate or lid contact face. The base 25 may be provided in any shape suitable for mounting to a vertical surface without limitation. In an aspect, the base 25 may have a generally flattened planar form, as illustrated in FIGS. 5-7.

The mounting face 25 shown on FIGS. 5-7 may be provided with an integral fastener as shown in FIG. 10 to fix the mounting face 25 to the vertical surface. Non-limiting examples of suitable integral fasteners include adhesive backings such as tacky or pressure-sensitive adhesives, a VELCRO pad to be joined with a corresponding VELCRO pad mounted on the vertical surface, one or more nails or screws, a magnet, or any other suitable fastening means known in the art. FIG. 10 shows a double sided adhesive 27 acting as the means for mounting the lower bracket to the vertical surface for illustrative purposes but any method may be utilized without limitation.

In addition, the base 25 may be provided with one or more passages 24 passing through the base 25 to accommodate one or more separate fasteners (not shown) for affixing the one or more lower brackets to the underlying vertical surface. Non-limiting examples of suitable separate fasteners include pins, tacks, nails, screws, bolts, or any other suitable fastener.

Referring back to FIGS. 5-7 the lower perpendicular element 26 may project from the base 25, forming a lid contact face 23. The lower perpendicular element 26 may be provided in any shape suitable for supporting the lower edge of the lid 40 without limitation. In an aspect, the lower perpendicular element 26 may have a generally flattened planar form, as illustrated in FIGS. 5-7. In an aspect, the lower perpendicular element 26 may project from the outer end of 25 at an angle of about 90° as illustrated in FIGS. 5-7.

The lid support face 23 may be provided in any shape without limitation including flat, curved, slanted, and faceted. In one aspect, the lid support face 23 may be flat, as illustrated in FIGS. 5-7. The contact face 23 may be fitted with some form of cushioning, without limitation, to help hold or protect the lid.

In an aspect, the perpendicular element 26 may terminate in a lower flange 22 aligned essentially perpendicular to the perpendicular element 26 and extending upward and parallel to the base 25. In an aspect, the length of the lower flange 22 may be any length suitable for retaining the lower edge of the lid 40. The length of the lower flange 22 dictates that flange 12 of the top bracket 10 must be at least ¼ inch longer than the lower flange 22 of the two or more lower brackets 20. The top bracket flange 12 and flange 22 of the lower brackets 20 function cooperatively to retain a lid 40 that has been inserted into the lid storage unit 100.

IV. Spacer

A spacer 52 may be used for proper installation of the top bracket 10 in relation to the bottom brackets 20 and the nested lid. The length 55 of the spacer can be any length, but may typically match the approximate width of the top bracket 10 shown in FIG. 3. The depth 54 of the spacer 52 may be slightly less than the height of the lid contact face 13 to provide sufficient clearance when the spacer 52 is nested up against the lid contact face 13 in the top bracket 10. The thickness 53 of the spacer 52 may be slightly greater than the length of flange 22 of the lower brackets 20 but no less than about ¼ inch longer than the flange length. This provides the proper spacing of the brackets during installation of the brackets around the lid 40. The spacer 52 is only used during the installation of the brackets of a lid storage unit 100 on a mounting surface but can be reused for the installation of other storage units 100 when assembling a lid storage system 1000.

V. Installation of Lid Storage Unit

The installation of a lid storage unit 100 or lid storage system 1000 will be done without restriction on a mounting surface oriented within about ±30° of vertical. In one aspect, the mounting surface may be a vertical surface including, but not limited to, the back of a cabinet door. The attachment of the brackets 10 and 20 to the surface as stated previously can use any known method of fastening without limitation. Non-limiting examples of suitable integral fasteners include adhesive backings such as tacky or pressure-sensitive adhesives, a VELCRO pad to be joined with a corresponding VELCRO pad mounted on the vertical surface, one or more nails or screws, a magnet, or any other suitable fastening means. However, for the following non-limiting example of an installation procedure a double sided adhesive tape is mentioned as a possible fastening method, as well as the possible use of screws. The following is a typical step by step installation procedure provided by way on a non-limiting example:

1. Remove the cabinet doors for ease of installation. However, this is not necessary.
2. Place cabinet door on flat surface with inside of door facing up.
3. Place some of the lids 40 on the inside door surface and try various arrangements to utilize the best use of space and allowing for bracket placement. Do not attach the brackets permanently at this time.
4. Once the arrangement of the brackets is determined, take two of the lower brackets 20 and locate them approximately 40° on either side of the centerline of the lid 40 and snug against the lid 40. Depending on the lid arrangement the lower brackets may vary from the typical 40° around the centerline and need not be symmetrical. Insure that each lid storage unit 10 does not interfere with the other lid storage units 10.
5. Place the top bracket 10 on the centerline of the lid at the top utilizing a spacer 52 for proper spacing. Place the spacer 52 between the top of the lid and the contact face 13 of top bracket 10. The surface 54 of the spacer 52 should be snug against the lid contact face 13 of the top bracket 10 and the top of the lid 40. The spacer can be removed later after the brackets are attached to the vertical surface.
6. Mark the location of each bracket on the door for proper placement in step 8.
7. Remove the lid 40 and brackets 10 and 20.
8. Apply double sided adhesive tape to the mounting surface 15 of the top bracket and the mounting surface 25 of the lower brackets 20.
9. Complete the attachment of the a bracket to the door by removing the protective film from the adhesive tape and sticking the bracket down onto the back of the door at the proper location marked in step 6. Press down firmly to make sure bracket is secure.
10. Repeat steps 8 and 9 for the other brackets.
11. Check to see that the lids nest properly within the brackets. Slide the lid into the top bracket as far as it will go. Next swing the lower part of the lid into the lower brackets and down. If the steps were followed properly the lid should nest easily, but also retain the lid within the brackets.
12. Screws should not be necessary for fastening the brackets to the mounting surface when double sided adhesive tape is used as the fastening means. However, screws can be added especially if the adhesive fails to adequately adhere due to a characteristic of the mounting surface including, but not limited to contour of the door such as a non-flat or curved contour, or a surface texture that interferes with the adhesion on the adhesive tape. While positioning the brackets in step 4 and 5 make a small indentation in the mounting surface using the screw holes 14 and 24 as a guide for forming guide bores in the mounting surface to guide and facilitate the insertion of any screws used to mount the brackets.
13. Screws are not provided but when buying them sure they are not too long that they would protrude through the door.
14. Using a screw driver, advance the screws through the brackets and into the underlying mounting surface making sure to not over tighten.

The preferred arrangement for the installation of the brackets is for the top bracket and two lower brackets are arranged around a lid in an inverted "Y" formation. The top bracket 10 is mounted on the centerline of the lid and the lower brackets 20 are arranged one on either side of the center line. The preferred location of the lower brackets is such that they are spaced approximately 40° on each side of the centerline with the vertex of the angle being the center of the lid and at a distance of the radius of the lid.

VI. Insertion and Removal of Lid to/from Lid Storage Unit

FIGS. 11A through 11F illustrates the insertion and removal of a lid 40 into a lid storage unit 100 after it has been attached to a vertical surface. FIG. 11A shows the lid 40 as it is angled into position to slide into the top bracket 10. FIG. 11B shows a progression of the movement of the lid 40 into the top bracket. FIG. 11C shows the lid 40 snug up against the perpendicular element 16 of the top bracket 10 and the bottom portion of the lid has been moved toward the vertical surface and clearing the flange 22 of the lower bracket 20. FIG. 11D shows the lid 40 snug up against the perpendicular element 16 of the top bracket 10 and the bottom portion of the lid has been moved in to butt up against the vertical surface. FIG. 11E shows the lid 40 lowered down to rest on the inside portion 23 of the perpendicular element 26 of the lower brackets 20. FIG. 11F shows an example of a stored position of the lid 40 within the lid storage unit 100. The upper portion of the lid 40 has tilted away from a vertical orientation and is resting on the flange 12 of the top bracket 10 but is restrained from falling out of the storage unit 100 by the flange. The removal of the lid 40 from the storage unit is performed essentially in the reverse order as described above.

IV. Lid Storage System

In aspect, a lid storage system 1000 may include two or more lid storage units 100 attached to a mounting surface. The lid storage system 1000 is not limited by the number of lid storage units 100 included. A typical lid storage system 1000 may include from about 3 to about 8 lid storage units 100. In another aspect, FIG. 12 illustrates an arrangement of four lids on the back of a cabinet door depicting a lid storage system 1000 that include four lid storage units 100A-100D. Other lid storage units 100 may be attached to other cabinet doors or similar vertical mounting surfaces to comprise a larger lid storage system 1000. The lids can be placed in any reasonable arrangement on a cabinet door as long as they do not interfere with each other, the cabinet frame or internal shelving. Essentially the lids 40 and associated lid storage units 100 may be almost right next to each other to best utilize the available space.

The foregoing merely illustrates the principles of the invention. Various modifications and alterations to the described embodiments will be apparent to those skilled in the art in view of the teachings herein. It will thus be appreciated that those skilled in the art will be able to devise numerous systems, arrangements and methods which, although not explicitly shown or described herein, embody the principles of the invention and are thus within the spirit and scope of the present invention. From the above description and drawings, it will be understood by those of ordinary skill in the art that the particular embodiments shown and described are for purposes of illustrations only and are not intended to limit the scope of the present invention. References to details of particular embodiments are not intended to limit the scope of the invention.

What is claimed is:

1. A storage unit adapted to releasably mount a lid of a cooking vessel to a vertical mounting surface, the storage unit comprising a top bracket and at least two lower brackets;

the top bracket comprising a top perpendicular element and a top flange, the top perpendicular element configured to project essentially perpendicular to the vertical mounting surface, the top flange extending downward from the top perpendicular element a top flange distance, the top perpendicular element defining a downward-facing object contact face; and the at least two lower brackets, each of the at least two lower brackets comprising a lower perpendicular element and a lower flange, the lower perpendicular element configured to project essentially perpendicular to the vertical mounting surface, the lower flange extending upward from the lower perpendicular element a lower flange distance, the lower perpendicular element defining an upward-facing object support face;

the top bracket and the at least two lower brackets adapted to be secured to the vertical mounting surface such that the at least two lower brackets are situated on opposite sides of a vertical object centerline of the lid such that when the lid is mounted in the storage unit, each upward-facing object support face is aligned along an arc coincident with a lower edge portion of the lid;

the top bracket is situated near the vertical object centerline above the at least two lower brackets such that the object contact face of the top bracket is situated a separation distance above an upper edge portion of the lid when the lower edge portion of the lid is resting on each object support face of each lower bracket, wherein the separation distance is at least ¼ inch greater than the lower flange distance of each lower bracket;

the lower flange distance is at least ⅛ inch greater than a thickness of the lid at a rim of the lid thereby restraining the lid; and the top flange distance is at least ¼ inch longer than the lower flange distance.

2. The storage unit of claim 1, wherein:

the top bracket further comprises a top base configured to project downward from the top perpendicular element opposite to the top flange, the top base defining a top mounting face situated against the vertical mounting surface; and each of the at least two lower brackets further comprises a lower base configured to project upward from the lower perpendicular element opposite to the lower flange, the lower base defining a lower mounting face situated against the vertical mounting surface; and the top mounting face and each lower mounting face further comprise a fastening means configured to attach to the vertical mounting surface.

3. The storage unit of claim 2, wherein the fastening means comprises a double-sided adhesive tape.

4. The storage unit of claim 2, wherein the top base defines one or more top passages and each lower base defines one or more lower passages, wherein the top passage and the one or more lower passages are configured to provide an additional means for fastening the upper bracket and each lower bracket to the vertical mounting surface.

5. The storage unit of claim 4, wherein the top bracket and each lower bracket are secured to the vertical mounting surface using at least one screw, wherein the at least one screw is inserted through each top passage and each lower passage and into the vertical mounting surface.

6. The storage unit of claim 1, wherein the vertical mounting surface comprises an interior cabinet door surface.

7. A storage system comprising two or more storage units as described in claim 1.

8. The storage system of claim 7, wherein each storage unit secures one corresponding lid and each storage unit is separated from corresponding adjacent storage units, such that each storage unit does not interfere with any corresponding adjacent storage unit and does not interfere with the use of any device associated with the vertical mounting surface.

9. The storage system of claim 8, wherein the device associated with the vertical mounting surface comprises a cabinet if the vertical mounting surface is a cabinet door.

10. The storage system of claim 8, wherein the device associated with the mounting surface comprises a kitchen counter if the vertical mounting surface is a kitchen backsplash.

11. A kit including a storage system, the storage system adapted to releasably mount at least one object to a vertical mounting surface, each object having a round disk shape comprising an edge, the edge comprising a upper edge portion and a lower edge portion, the storage system comprising at least one storage unit, each of the at least one storage unit comprising at least one top bracket, at least two lower brackets and a temporary spacer;

each top bracket comprising a top perpendicular element and a top flange, the top perpendicular element configured to project essentially perpendicular to the vertical mounting surface, the top flange extending downward from the top perpendicular element a top flange distance, and the top perpendicular element defining a downward-facing object contact face;

each of the at least two lower brackets comprising a lower perpendicular element and a lower flange, the lower perpendicular element configured to project essentially perpendicular to the vertical mounting surface, the lower flange extending upward from the lower perpendicular element a lower flange distance, the lower perpendicular element defining an upward-facing object support face;

for each of the at least one storage unit:
 the at least two lower brackets are configured to be secured to the vertical mounting surface such that the upward-facing object support faces of the at least two lower brackets are situated on opposite sides of a vertical centerline of the object and adjacent to the lower edge portion of the object;
 each top bracket is configured to be secured to the vertical mounting surface such that the temporary spacer is situated between the downward-facing object contact face and the upper edge portion at the vertical centerline of the object; and
 the temporary spacer is configured to be removed from each storage unit after the top bracket is secured to the vertical mounting surface.

12. A combination comprising:
a lid of a cooking vessel defining a vertical centerline, the lid having a rim defining an upper edge portion, a lower edge portion, and a thickness; and
a storage unit comprising a top bracket and at least two lower brackets, the top bracket and at least two lower brackets being collectively adapted to releasably mount the lid on a vertical mounting surface;
 the top bracket comprising a top perpendicular element and a top flange, the top perpendicular element being configured to project essentially perpendicular to the vertical mounting surface, the top perpendicular element defining a downward-facing object contact face, the top flange extending downward from the top perpendicular element a top flange distance;
 each of the at least two lower brackets comprising a lower perpendicular element and a lower flange, the lower perpendicular element being configured to project essentially perpendicular to the vertical mounting surface, the lower perpendicular element defining an upward-facing object support face, the lower flange extending upward from the perpendicular element a lower flange distance; and
 the top bracket and the at least two lower brackets being adapted to be secured to the vertical mounting surface such that:
  the at least two lower brackets are situated on opposite sides of the vertical centerline of the lid and each of the upward-facing object support faces contact the lower edge portion of the lid; and
  the top bracket is situated at or near the vertical centerline of the lid and spaced above the at least two lower brackets and the object contact face of the top perpendicular element is situated a separation distance above the upper edge portion of the lid, the separation distance being at least ¼ inch longer than the lower flange distance of each of the at least two lower brackets;
 the lower flange distance being at least ⅛ inch longer than the thickness of the rim of the lid; and
 the top flange distance being at least ¼ inch longer than the lower flange distance.

13. The combination of claim 12, wherein:
the top bracket further comprises a top base configured to project essentially perpendicularly downward from the top perpendicular element opposite to the top flange, the top base defining a top mounting face situated against the vertical mounting surface; and
each of the at least lower brackets further comprises a lower base configured to project essentially perpendicularly upward from the lower perpendicular element opposite to the lower flange, the lower base defining a lower mounting face situated against the vertical mounting surface; and
a fastening means for attaching the top mounting face and each lower mounting face to the vertical mounting surface.

14. The combination of claim 13, wherein the fastening means comprises a double-sided adhesive tape.

15. The combination of claim 13, wherein the top base defines one or more top passages and each of the at least two lower bases define one or more lower passages, wherein the one or more top passages and the one or more lower passages are configured to provide an additional means for fastening the top bracket and each of the at least two lower brackets to the vertical mounting surface.

16. The combination of claim 15, wherein the top bracket and each of the at least two lower brackets are fastened to the vertical mounting surface using at least one screw wherein the at least one screw is inserted through one of the one or more top passages and one of the one or more lower passages and into vertical mounting surface.

17. The combination of claim 12, wherein the vertical mounting surface comprises an interior cabinet door surface.

18. The combination of claim 11, wherein the object comprises a lid of a cooking vessel.

* * * * *